(12) United States Patent
Eikelenberg et al.

(10) Patent No.: US 10,986,964 B2
(45) Date of Patent: Apr. 27, 2021

(54) DUAL SPEED MANUAL STAND MIXER

(71) Applicant: Dart Industries Inc., Orlando, FL (US)

(72) Inventors: Ralph F. E. Eikelenberg, Gooik (BE); Antoon Keymeulen, Aalst (BE); Dongjin Byeon, Aalst (BE)

(73) Assignee: Dart Industries Inc., Orlando, FL (US)

( * ) Notice: Subject to any disclaimer, the term of this patent is extended or adjusted under 35 U.S.C. 154(b) by 90 days.

(21) Appl. No.: 16/552,068

(22) Filed: Aug. 27, 2019

(65) Prior Publication Data
US 2021/0059477 A1  Mar. 4, 2021

(51) Int. Cl.
*B22C 5/00* (2006.01)
*A47J 43/10* (2006.01)
*B01F 7/00* (2006.01)

(52) U.S. Cl.
CPC ....... *A47J 43/1025* (2013.01); *A47J 43/1037* (2013.01); *B01F 7/0025* (2013.01); *B01F 7/00025* (2013.01); *B01F 7/00116* (2013.01)

(58) Field of Classification Search
None
See application file for complete search history.

(56) References Cited

U.S. PATENT DOCUMENTS

| | | |
|---|---|---|
| 686,479 A | 11/1901 | Ranz |
| 2,568,318 A | 9/1951 | Chester |
| 2,867,419 A * | 1/1959 | Heinzerling ........ A47J 43/1025 366/244 |
| 2013/0184118 A1* | 7/2013 | Chan ........................ A47J 43/24 475/290 |
| 2015/0342410 A1* | 12/2015 | Jeong ........................ F16H 1/46 475/269 |

FOREIGN PATENT DOCUMENTS

| | | | |
|---|---|---|---|
| CN | 201734586 U | 2/2011 | |
| CN | 202801344 U | 3/2013 | |
| DE | 390 320 | 2/1924 | |
| DE | 901 641 | 1/1954 | |
| ES | 2 347 199 | 10/2010 | |
| FR | 1 069 108 | 7/1954 | |
| GB | 2454172 A * | 5/2009 | ............. H02K 7/116 |

OTHER PUBLICATIONS

Tupperware Power Chef™ Whip Accessory. Jan. 2014.

* cited by examiner

*Primary Examiner* — Anshu Bhatia
*Assistant Examiner* — Greg Huan
(74) *Attorney, Agent, or Firm* — Taylor J. Ross

(57) ABSTRACT

A dual speed manual stand mixer. The mixer has a bowl with a cover fixed to the bowl. The cover includes a ring selectively mounting to the rim of the bowl, and a turntable mounted for rotation within the ring. Multiple whisks extend downward from the turntable into and within the bowl. Gearing is provided to cause both rotation of the turntable, as well as rotation of each individual whisk. A transmission is also provided to selectively connect a manual crank arm in one of two possible limit positions. The gearing ratios differ between these two position to thus drive the turntable and whisk rotation at two different speeds.

1 Claim, 8 Drawing Sheets

US 10,986,964 B2

DUAL SPEED MANUAL STAND MIXER

CROSS REFERENCE TO RELATED APPLICATIONS

This application is related to co-pending Ser. No. 29/703,383, which is incorporated herein by reference.

STATEMENT REGARDING FEDERALLY SPONSORED RESEARCH

Not applicable.

BACKGROUND OF THE INVENTION

The present invention relates in general to food or similar mixers. In particular, to a food mixer powered by hand.

The preparation of various doughs, batters, creams, etc. requires the combining of two or more ingredients. While plain stirring of ingredients in a bowl is sometimes used, it is more preferred to employ one or more rotating beaters or whisks which are inserted within and move through the ingredients while rotating. These are typically broken into two categories: hand mixers, and stand mixers. With hand mixers the user moves the beaters within the bowl and determines the area being mixed. With stand mixers the bowl is fixed and the beaters move within the bowl following a path determined by the mechanism employed. Both type of mixers may be further subdivided into either powered (typically by an electric motor) or manual (hand-powered).

SUMMARY OF THE INVENTION

An object of the present invention is to provide a food mixer.

Another object of the present invention is to provide such a device which operates as a manual stand mixer.

A further object of the present invention is to provide a manual stand mixer which allows for two different mixing speeds selectable as desired.

These and other objects are achieved by a dual speed manual stand mixer. The mixer has a bowl with a cover fixed to the bowl. The cover includes a ring selectively mounting to the rim of the bowl, and a turntable mounted for rotation within the ring. Multiple whisks extend downward from the turntable into and within the bowl. Gearing is provided to cause both rotation of the turntable, as well as rotation of each individual whisk. A transmission is also provided to selectively connect a manual crank arm in one of two possible limit positions. The gearing ratios differ between these two positions to thus drive the turntable and whisk rotation at two different speeds.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
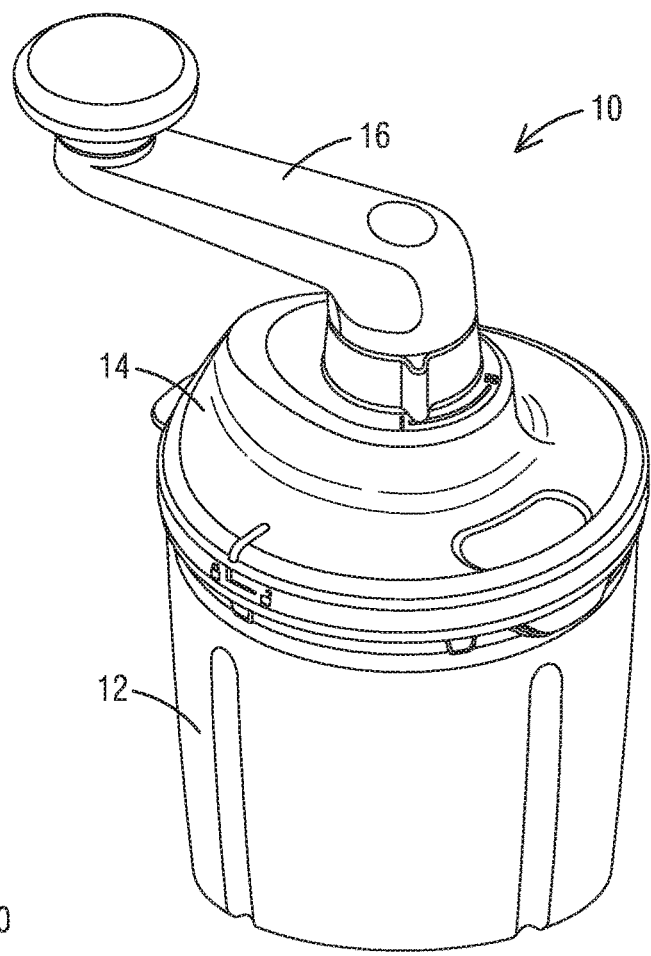
FIG. 1 is a top perspective view of the dual speed manual stand mixer according to the present invention.

With reference to FIG. 1, a dual speed manual stand mixer according to the present invention is generally designated by reference numeral 10. The mixer 10 includes a base 12 and a cover 14 resting upon the base 12. The base 12 takes the general form of a bowl and is intended to receive the various ingredients to be mixed. In the embodiment shown the base 12 take the form of a pitcher with a handle and spout, but other forms are possible, such as simple bowls. The cover 14 includes a crank arm 16 extending vertically away from the base 14. It is preferred that the cover 14 include means to prevent relative rotation with respect to the base 12, such as mating ledges and notches, bayonet connection, etc. This will allow the crank arm 16 to be more easily rotated without slipping between the base 12 and cover 14.

Figure 2:
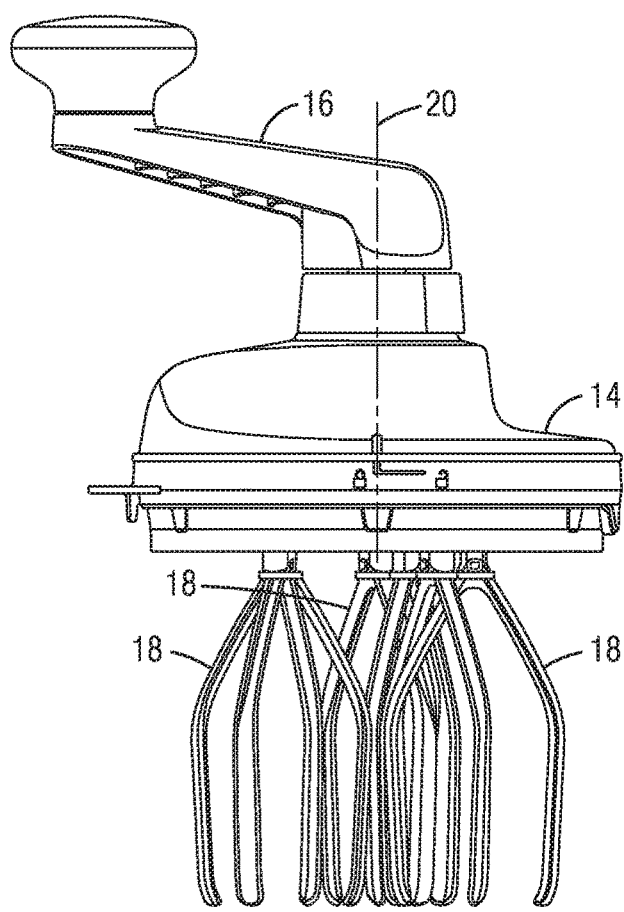
FIG. 2 is a side view of the mixer cover with the base removed.

As best shown in FIG. 2, the cover 14 has several pairs of whisks 18 extending downward so as to be received within the base 12 when assembled in the operative configuration of FIG. 1. Rotation of the crank arm 16 will result, as described below, in each individual whisk 18 rotating about its own axis, while all whisks 18 rotate also about a central axis 20. In this manner the whisks 18 may stir and mix the various ingredients within the base 12.

Figure 3:
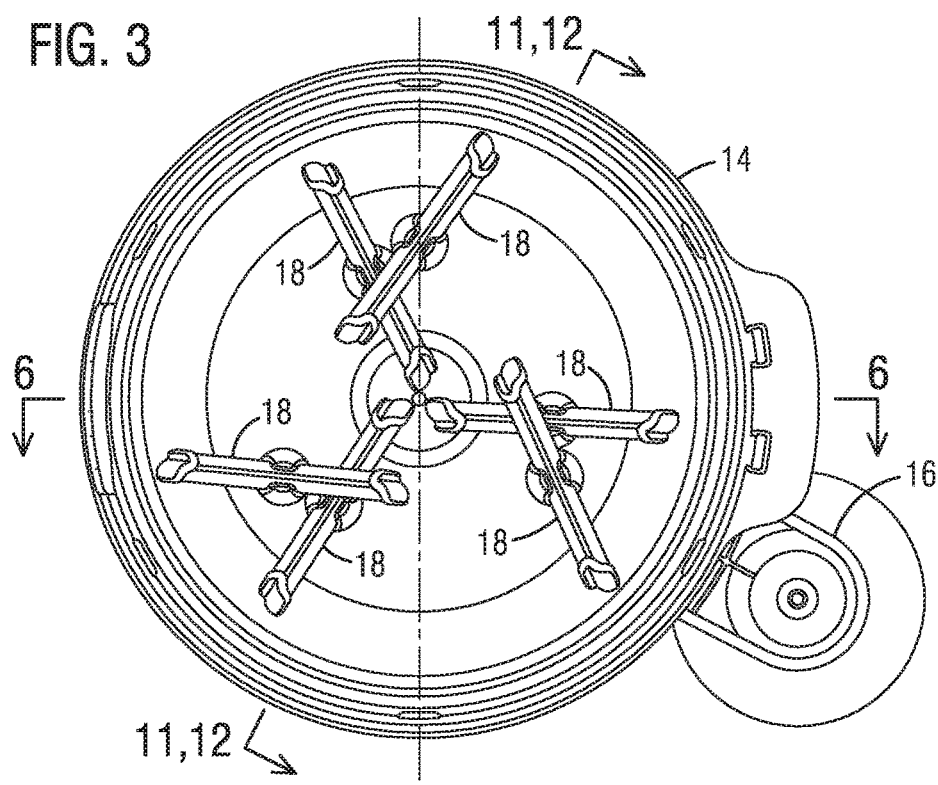
FIG. 3 is a bottom view of the mixer cover.
Figure 4:
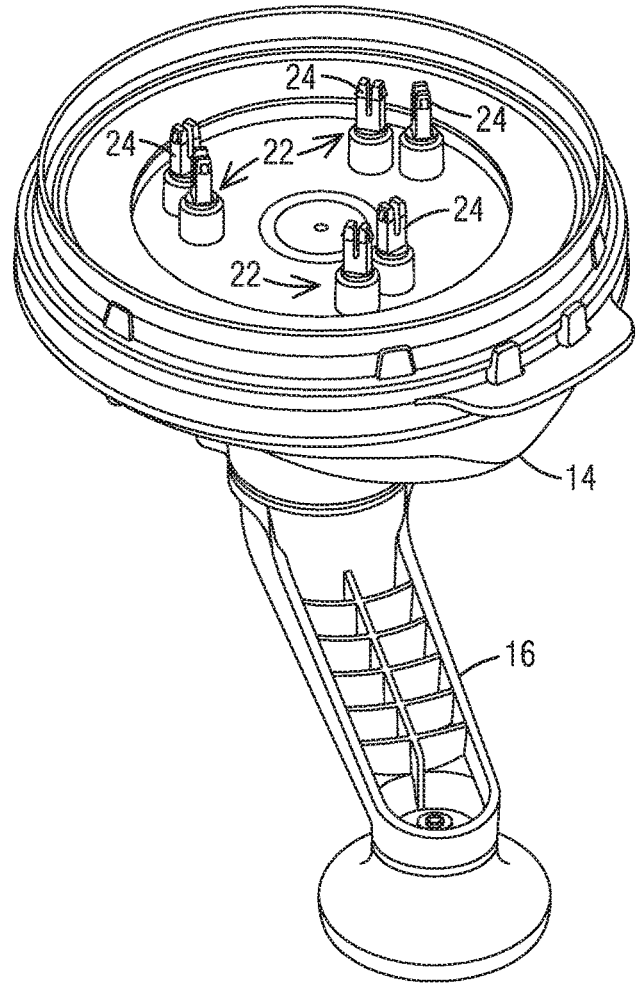
FIG. 4 is bottom perspective view of the mixer cover with whisks removed for clarity.

It is preferred that the whisks 18 be removable from cover 14 for cleaning. As best illustrated in FIG. 2, there is provided a connector pin 22 for each of the whisks 18. These connector pins 22 will include a base end 24 extending below the main body of the cover 14 toward the base 12, and each base end 24 will form a press fit with the associated whisk 18 to allow manual attachment and detachment by pushing or pulling, respectively. As best shown in FIG. 3, it is preferred that the whisks be arranged in pairs and each pair being spaced less than the width of the whisk 18 such that the extent of rotation of the whisks 18 in each pair overlap. The whisks 18 in each pair will rotate in opposite directions, and are oriented so as to not interfere with each other. To enforce this orientation, it is preferred that the connector pins 22 include a shape which allows mounting of the whisk 18 only in the proper orientation.

Figure 5:
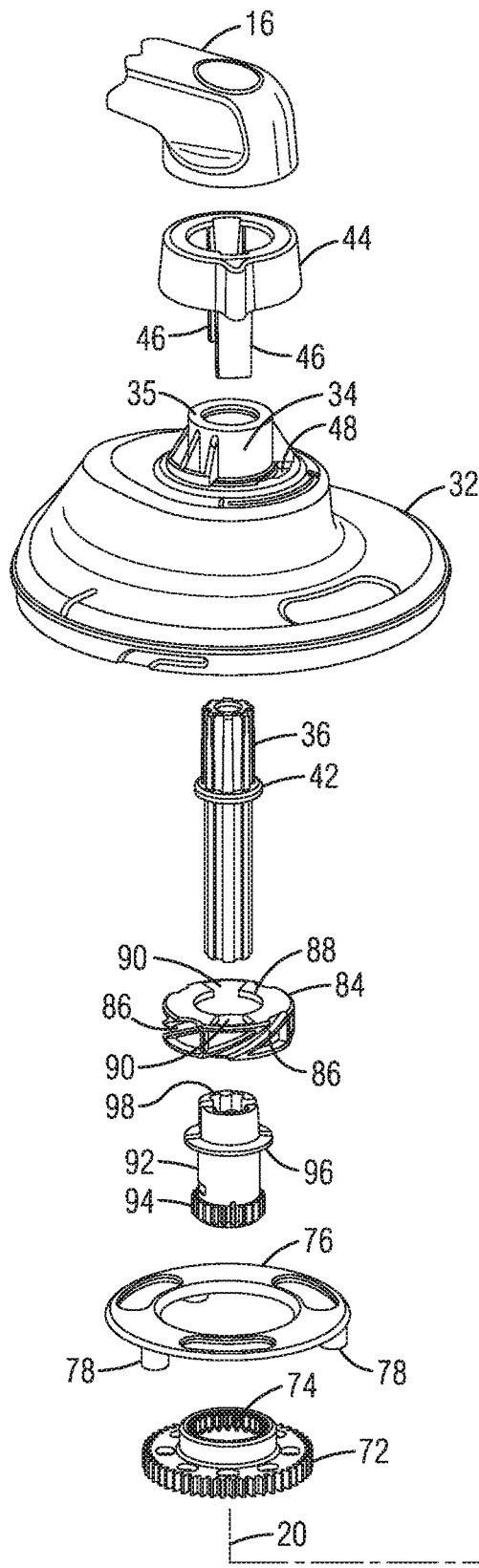
FIG. 5 is an exploded view of the mixer cover of FIG. 2.
Figure 5:
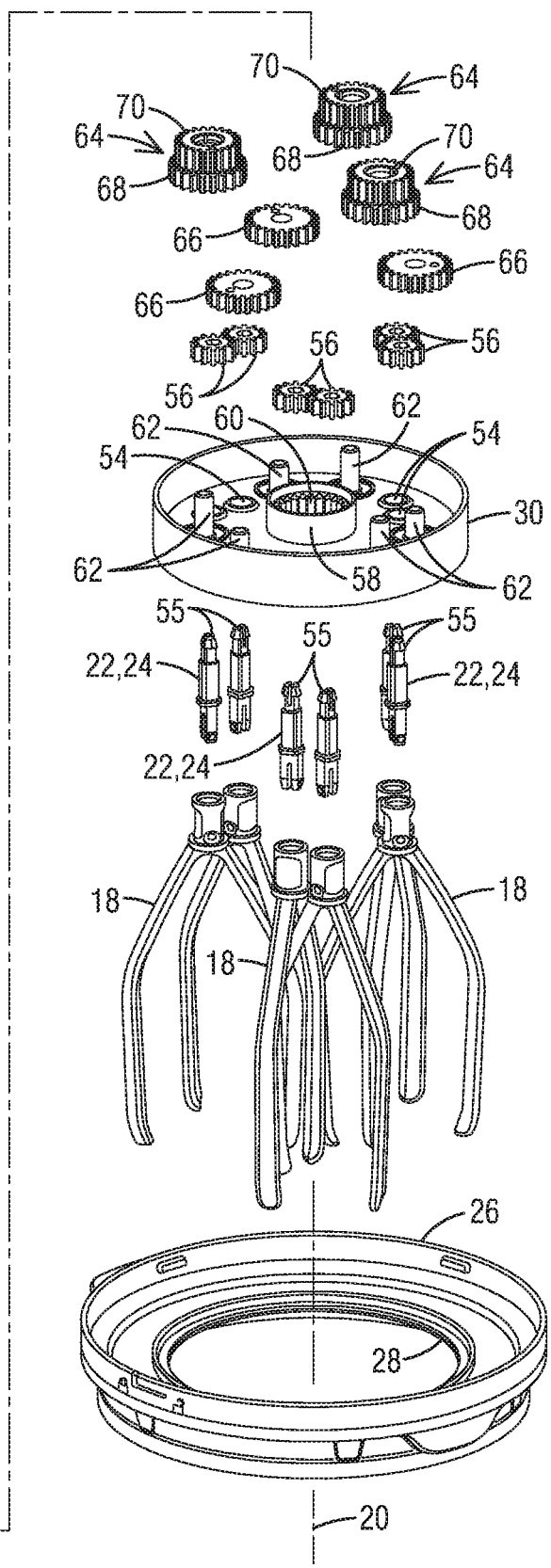

The cover 14 is in main formed by a rim ring 26 having a central aperture 28, a turntable 30, and a top cover 32. The rim ring 26 includes a vertical wall spaced just outward of the central aperture 28, with this vertical wall having an annular form aligned with the central axis 20 and having a diameter sized to closely but slidingly receive the turntable 30. At least one of the top cover 32 and rim ring 26 will include a peripheral sidewall and means for connecting these two elements. As best shown in FIG. 5, it is preferred that both the rim ring 26 and top cover 32 include peripheral side walls with the connection formed as a bayonet such as with protrusions on the rim ring 26 mating with and received in slots on the top cover 32. In this manner it may be seen that the top cover 32 may be secured to the rim ring 26, with the turntable 30 resting upon the rim ring 26 for relative rotation while at the same time blocking the central aperture 28.

Figure 6:
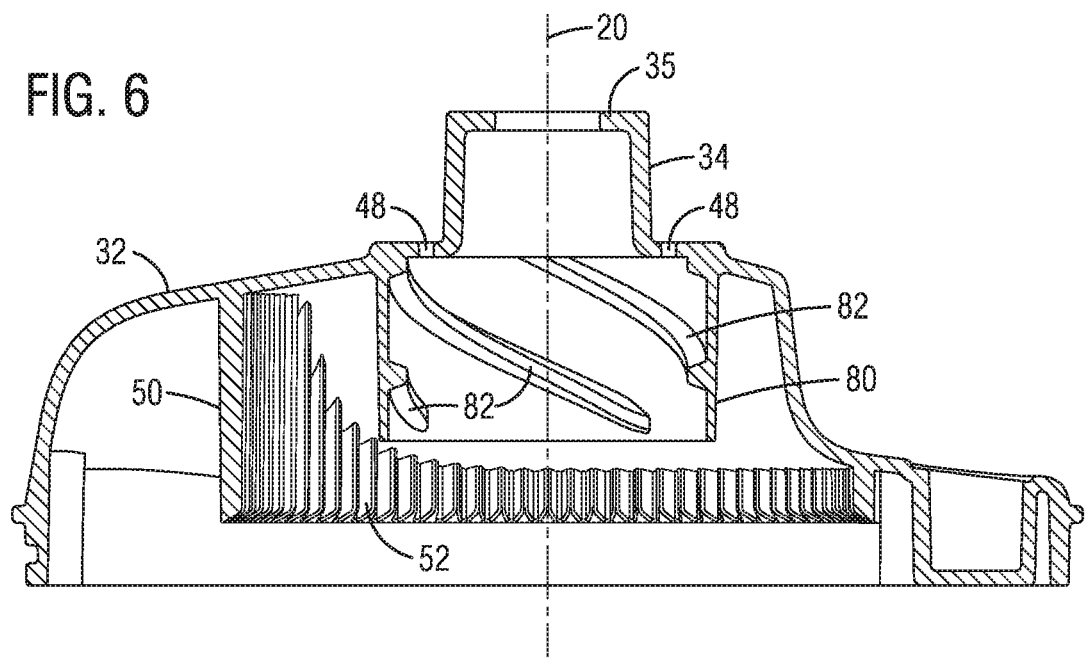
FIG. 6 is a cross-sectional view along line 6-6 of FIG. 3, with parts removed for clarity.
Figure 7:
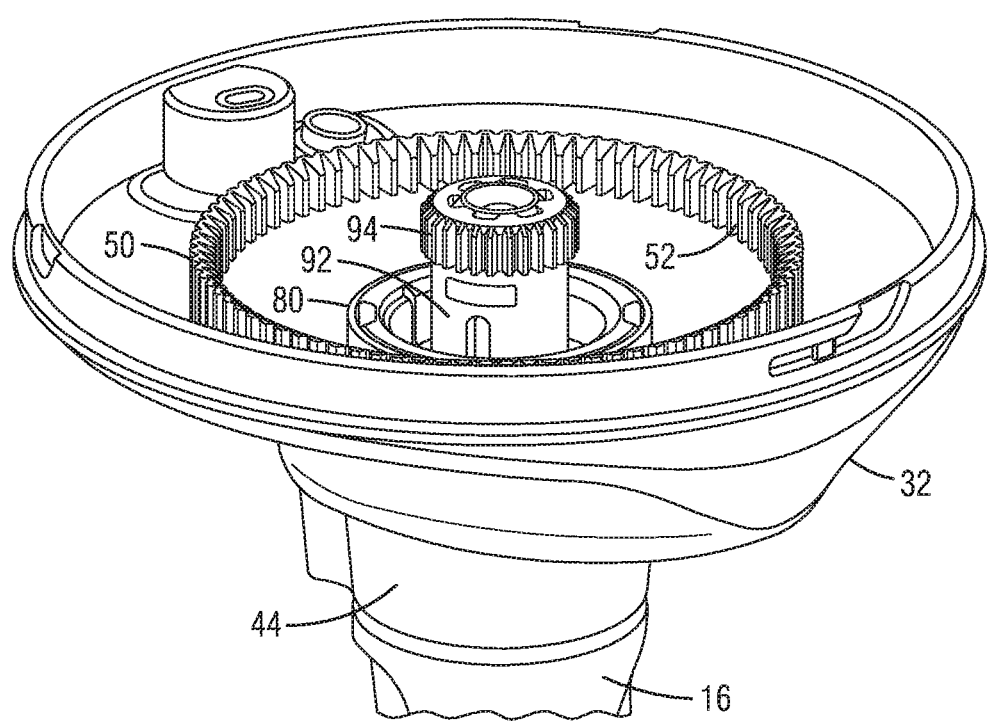
FIG. 7 is a bottom perspective view of the top cover.
Figure 11:
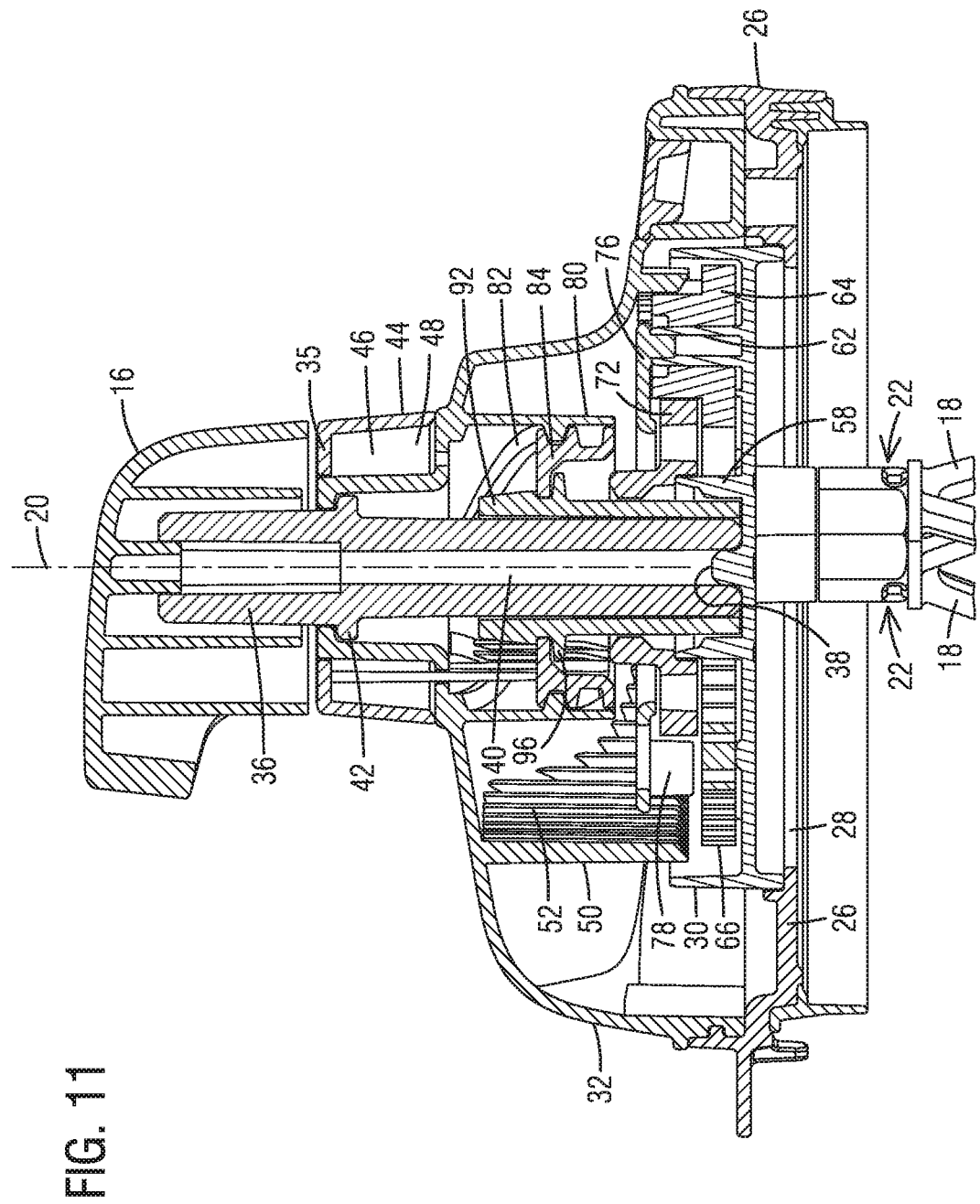
FIG. 11 is cross-sectional view along line 11-11 of FIG. 3, in the first speed condition.
Figure 12:
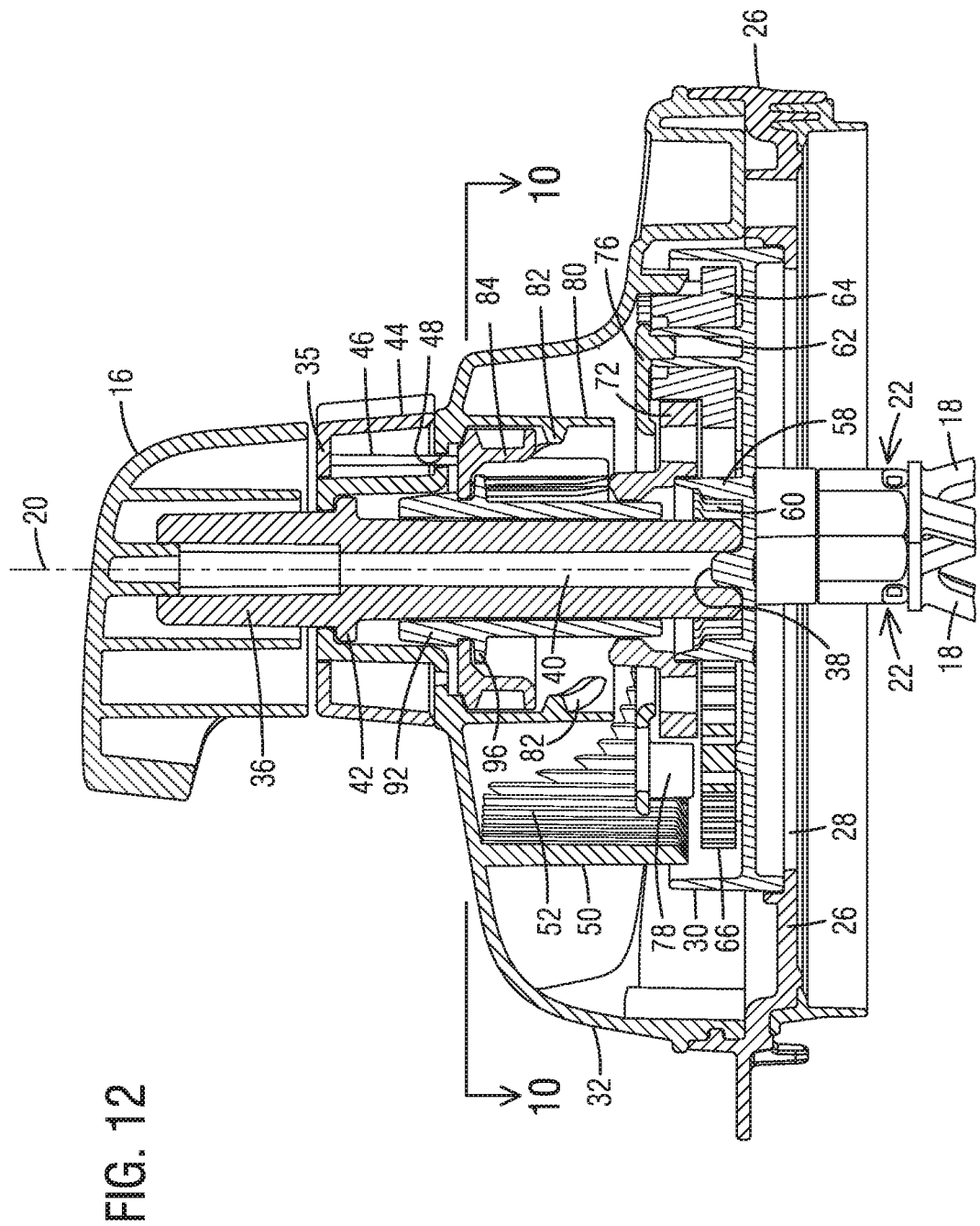
FIG. 12 is cross-sectional view along line 11-11 of FIG. 3, in the second speed condition.

The top cover 32 includes a shaft journal 34 extending vertically, with shaft journal 34 including a circular aperture aligned with central axis 20. As is best shown in FIG. 6, the shaft journal 34 includes a shaft ledge 35 extending radially inward. A shaft 36 is mounted within the cover 14, with shaft 36 being aligned with, and mounted for rotation about, the central axis 20. As best shown in FIGS. 11 and 12, the turntable 30 includes a shaft nub 38 extending upward at the center, and thus in alignment with central axis 20. The shaft 36 at its lower end includes a hollow 40 sized to closely receive the shaft nub 38. This connection of the shaft nub 38 and hollow 40 will prevent lateral movement of the lower end of shaft 36, while still allowing the shaft to rotate independently of the turntable 30.

The shaft 36 has a length such that when cover 14 is assembled, and shaft 36 is resting on the shaft nub 38, the upper end of the shaft 36 will extend through shaft journal 34, and be closely received within the annular shaft ledge 35. The shaft 36 will further include a cap ledge 42 extending radially outward at a position spaced from the top end of shaft 36. In particular, the cap ledge 42 is located such that it will be closely received below the shaft ledge 35. In this manner the turntable 30 and shaft ledge 35 serve to block vertical movement of the shaft 36 relative to cover 14, while still permitting the shaft 36 to rotate about axis 20 relative to both the top cover 32 and turntable 30. The crank arm 16 includes an inner end with is fixed to the shaft 36, such that when crank arm 16 is rotated the shaft 36 will rotate with it.

An important feature of the present invention is the inclusion of selector ring 44. Comparison of FIGS. 5 and 11 will show that the selector ring 44 is closely received about the shaft journal 34, and is also closely received between top cover 32 and the inner end of crank arm 16. In this manner the only movement selector ring 44 is permitted is rotation about the shaft journal 34. However, this rotation is also limited. The selector ring 44 includes one or more (two being shown) fingers 46 extending downward therefrom. The top cover 32 includes a like number (two being shown) of finger slots 48. The finger slots are arcuate in form, centered on the axis 20, and having a length appreciably longer than the width of the associated finger 46. As shown, the fingers 46 extend through the associated finger slots 48, so that the selector ring 44 is limited to oscillating between the limits imposed by the fingers 46 abutting one or the other end of finger slots 48. As will be explained below, this manual oscillation of the selector ring 44 between its two limit positions will cause a change in gearing and thus the operating speed of the mixer 10.

As described above, rotation of crank arm 16 will cause identical rotation of the shaft 36 relative to top cover 32, and with the shaft capable or rotation independently of turntable 30. Transmitting this crank arm 16 rotation into rotation of the turntable 30 and individual whisks 18 requires a gear train, and for the present invention a gear train with a two-speed transmission.

The top cover 32 is shown in FIG. 6 with all other components removed for clarity. As may be seen, the top cover 32 includes an annular ring wall 50 extending downward from its interior, and aligned about the central axis 20. The interior face of this ring wall 50 includes vertical teeth such that the interior of ring wall 50 forms a redial inward ring gear 52.

As best shown in FIG. 5, the upper interior face of the turntable 30 includes several pairs (three pairs being shown) of pin apertures 54, each of which will closely receive an associated one of the connector pins 22 for rotation within the pin aperture 54. With the base ends 24 of connector pins 22 extending below the turntable 30, a gear end 55 of each connector pin 22 extends upward from the turntable 30. Each of these gear ends 55 connects in a fixed manner to a spin gear 56, such that the two elements rotate together. The spin gears 56 in each such pair have equal diameters and are in meshed engagement, and as such the rotation of one spin gear 56 clockwise (and thus the associated whisk 18) will cause the paired spin gear 56 to rotate counterclockwise (and thus the associated paired whisk 18).

The pin apertures 54, and thus the whisks 18 may have an equal radial spacing from the center of turntable 30. It is preferred, however, that each pair of pin apertures 54 (and thus whisks 18) include one which is radially inward, and one which is radially outward, as shown. This radial spacing is sufficient that turntable 30 includes a drive wall 58 extending upward from the turntable 30 at a position surrounding shaft nub 38, yet radially inward of the pin apertures 54. This drive wall 58 will be annular and centered upon the axis 20, and include vertical teeth on its inner face to form a turntable drive gear 60. As drive wall 58 is fixed to turntable 30 (preferably monolithically as shown), then the turntable drive gear 60 is also fixed to the turntable 30. As such, rotation of the turntable drive gear 60 will cause equal rotation of turntable 30.

Figure 8:
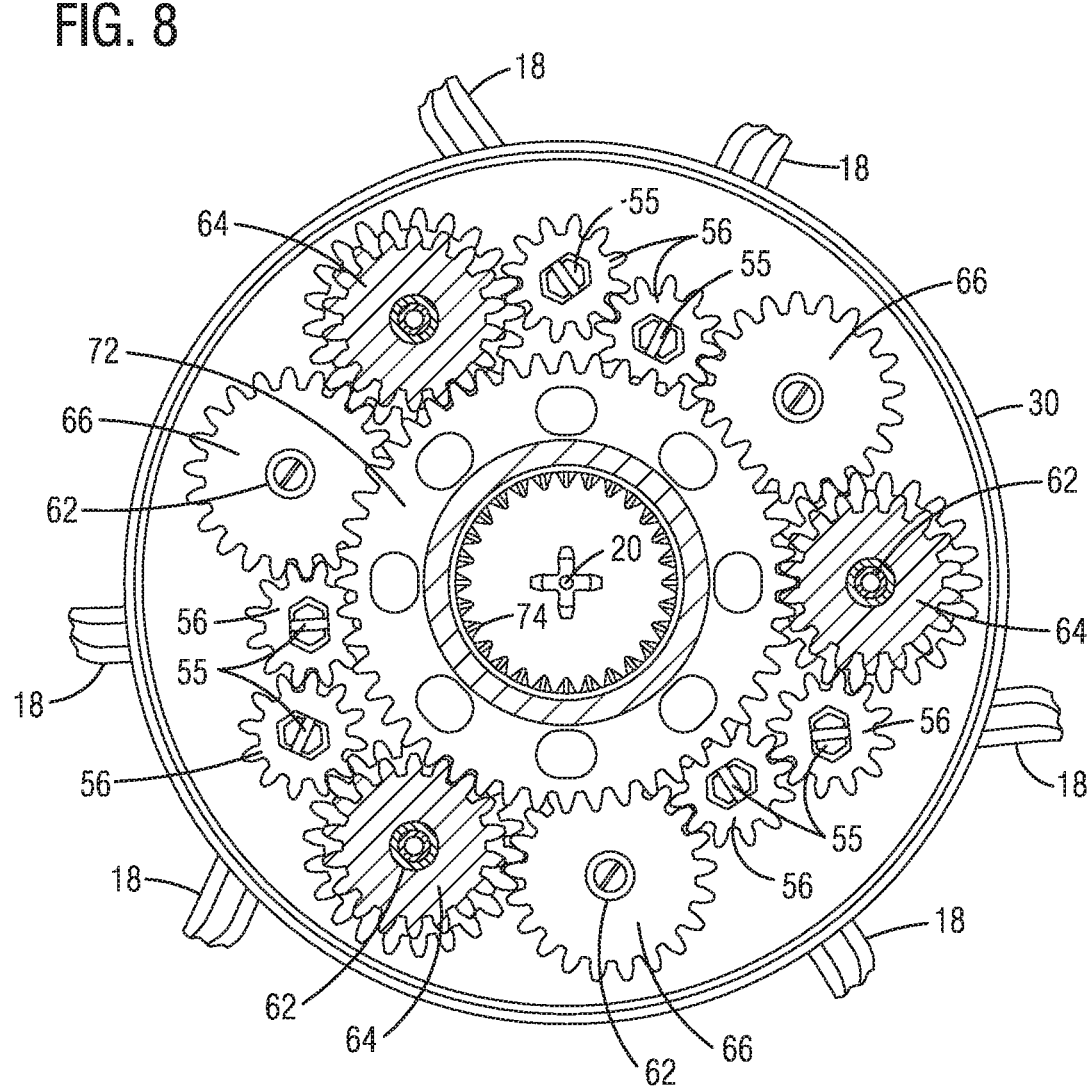
FIG. 8 is a cross-sectional view along line 8-8 of FIG. 9.
Figure 9:
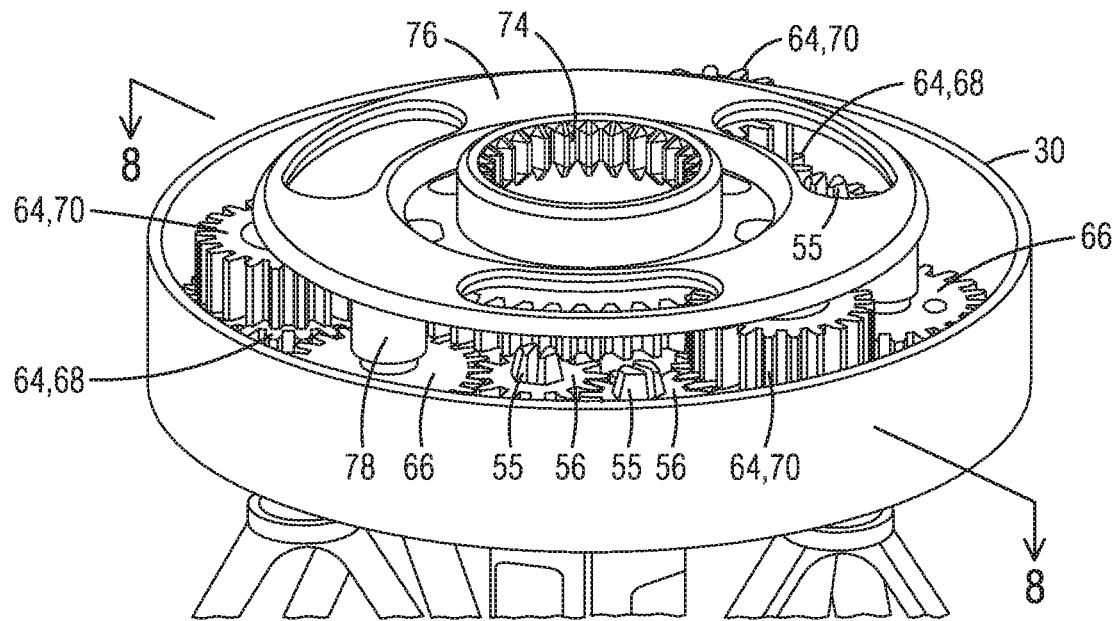
FIG. 9 is a perspective view of the turntable and gear sub-assembly.
Figure 10:
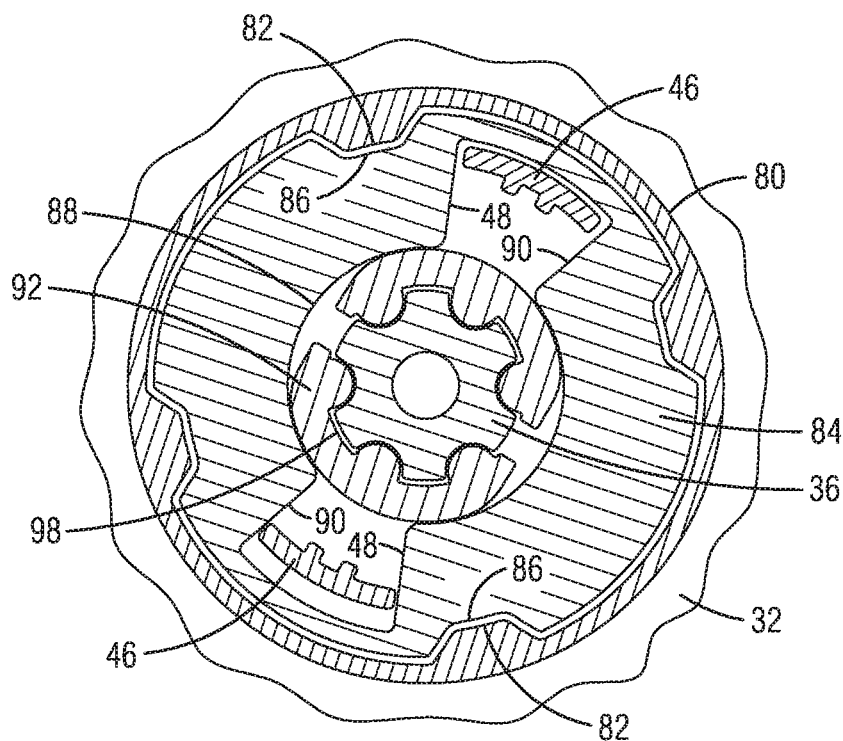
FIG. 10 is cross-sectional view along line 10-10 of FIG. 12.

Each pair of pin apertures 54 are also peripherally spaced about the turntable, creating a peripheral gap between each such pair. Peripherally between each pair of pin apertures 54 the turntable 30 includes a pair of gear posts 62 extending upward. Each of the gear posts 62 is cylindrical and acts as a shaft for rotation. Specifically, as best illustrated in FIG. 8, every other gear post 62 will mount for rotation a stacked gear 64. Further, each of the remaining, alternating, gear posts 62 will mount for rotation a train gear 66.

Each of the stacked gears 64 includes a lower section having a first diameter and surrounded by gear teeth to form a chain gear 68, and an upper section having a second diameter, less than the first diameter, and surrounded by gear teeth to form a planet gear 70. Each chain gear 68 and its associated planet gear 70 are fixed together (preferably monolithically) such that they rotate together.

As best shown in FIG. 8, each chain gear 68 meshes with its associated train gear 66. Further each pair of chain gears 68 and train gears 66 are arranged such that the chain gear 68 meshes with a first spin gear 56, while the train gear 66 meshes with a second spin gear 56 from a different pair of spin gears 56. As such, the spin gears 56, chain gears 68 and train gears 66 are all meshed together in a circular chain about axis 20. Because of this, the rotation of any one of the stacked gears 64 causes its associated chain gear 68 to rotate, and this rotation of any one of the chain gear 68 rotating will cause all other spin gears 56 and train gears 66 to rotate. This gear rotation will in turn cause each whisk 18 to rotate, with each pair of whisks 18 counter-rotating with respect to each other.

Placed centrally of all planet gears 70 there is a sun gear 72 having radially exterior gear teeth in meshed engagement with each planet gear 70. Due to the chain gears 68 having a larger diameter than the planet gears 70, the chain gears 68 form a discontinuous ledge which will support the sun gear 72. The sun gear 72 further includes a central aperture aligned with axis 20 and including radially inward gear teeth to form a sun drive gear 74. This sun drive gear has identical diameter and gearing as the turntable drive gear 60, for reasons made apparent below.

The various spin gears 56, stacked gears 64 and train gears 66 need to be secured vertically to ensure they remain meshed. This can be achieved by using undercuts to form a press fit, as shown in the gear ends 55. While gear posts 62 could be formed similarly, it is preferred to provide a gear plate 76 fixed to the gear posts 62 as by adhesive, ultrasonic welding, etc. The gear posts 62 may have a length close to that of the stacked gears 64, and as such the gear plate 76 could rest upon these gear posts 62 to prevent vertical motion of the stacked gears 64. The train gears 66, however, have a lesser height. To secure these train gears the gear plate can include spacer posts 78 extending downward, and spaced so as to mate with and slide over each of the gear posts 62—at least those associated with the train gears 66. As shown, the gear plate 76 further includes a central aperture such that the first drive gear 60 is not obstructed.

As best shown in FIG. 8, the various gears 56, 66, and 68 are meshed together, and the sun gear 72 is meshed with the planet gears 70, all upon turntable 30. When turntable 30 is assembled to the rim ring 26, and the top cover 32 is then assembled to the rim ring 26, then the ring gear 52 will surround, and be in meshed engagement with, the planet gears 70. This is best shown in FIGS. 11 and 12.

The arrangement of gears mounted on turntable 30 is driven by rotation of the crank arm 16. The connection of the crank arm 16 is, however, variable between two positions to thus drive these gears differently and create the two speeds as desired. In particular, the top cover 32 includes a selector wall 80 extending downward therefrom. The selector wall 80 is annular, centered upon axis 20, and has a diameter less than that of ring wall 50 such that the selector wall 80 is concentrically within the ring wall 50. The inner face of the selector wall 80 includes a series of first selector threads 82 on its radially interior face.

The mixer 10 also includes a selector disc 84 having an annular form. The diameter of the outer face of the selector disc 84 is sized to closely fit within the selector wall 80, and the outer annular edge of selector includes a set of second selector threads 86 which will mate with the first selector threads 82. As such, when threads 82 and 86 are engaged, rotation of the selector disc 84 about the axis 20 will cause the selector disc to translate upward or downward. The selector disc 84 further includes a central disc aperture 88 sized to have a diameter greater than that of shaft 36, as well as one or more disc slots 90, each adapted to closely receive an associated one of the fingers 46. This is a sliding fit in the vertical direction of the fingers 46.

As may be envisioned, oscillation of the selector ring 44 about axis 20 between its two limit positions will cause similar oscillation of the fingers 46. In turn, the oscillation of the fingers 46 (received in the disc slots 90) will cause an identical oscillation of the selector disc 84 about axis 20. Due to the engagement of the first and second selector threads 82 and 86, this oscillation causes the selector disc 84 to translate upward and downward between two limit positions.

The mixer 10 further includes a shaft slider 92. The shaft slider takes the general form of a cylinder having at its lower end a set of radially outward teeth forming a slide gear 94. The diameter and gearing of the slide gear 94 is such that it may mesh with each of the turntable drive gear 60 and the sun drive gear 74. The upper end of shaft slider 92 includes means for a rotary connection with the selector disc 84. In the embodiment shown, this is formed by a slider ledge 96 spaced from the upper end of shaft slider 92, combined with a press-fit undercut spaced from the slider ledge so as to closely receive the selector disc 84 therebetween. This connection fixes the selector disc 84 and shaft slider 92 against relative translation vertically, but still allows the selector disc 84 and shaft slider 92 to rotate with respect to each other. Given this, it may be seen that the shaft slider 92, and its slide gear 94, will translate upward and downward between the limit positions defined by the selector disc 84 and selector ring 44.

Completing the structure of mixer 10, the shaft 36 (at least below shaft ledge 35 but preferably for its full length) is not cylindrical but is instead of a geometric cross section. The shaft slider 92 further includes a slide aperture 98 having a mating geometric cross section. In the embodiment shown, the shaft 36 geometry is formed by a series of longitudinal splines. In this manner the shaft slider 92 may translate along the shaft 36 between the limit positions defined by the oscillations of the selector disc 84), but is constrained to rotate with shaft 36. Finally, the locations and sizes of the various components are chosen such that the limit positions of the translation of shaft slider 92 coincide with the slide gear 94 being engaged with turntable drive gear 60 in a first, lower limit position, and with the slide gear 94 being engaged with the sun drive gear 74 in a second, upper limit position.

With the structure described, the operation of the mixer 10 will be explained. The user will rotate the selector ring to the desired limit position. This will cause rotation of the fingers 46, and thus rotation of the selector disc 84. This rotation of the selector disc 84 will cause relative rotation of the first and second selector threads 82 and 86, resulting in the vertical transition of the selector disc 84 to one of its limit positions. This in turn causes the shaft slider 92 to translate vertically upon shaft 36 to one of its limit positions, and at this point the slide gear 94 engages with one or the other of the turntable drive gear 60 or sun drive gear 74 (depending upon the direction of rotation of selector ring 44 by the user.

For purposes of this explanation, it will be assumed that this one of the limit positions is the first, lower limit position such that the slide gear 94 is engaged with the turntable drive gear 60. As noted, the crank arm 16 is fixed to the shaft 36. As such, manual rotation of the crank arm 16 by the user will cause a similar rotation of the shaft 36. This will in turn cause similar rotation of the slide gear 94, and thus the turntable drive gear 60. Since turntable drive gear 60 is fixed to turntable 30, the entire turntable 30 is rotated relative to the rim ring 26 and top cover 32 at an identical rotation to that of the crank arm 16. This will result in the various whisks 18 being rotated about the axis 20 within the base 12.

As noted above, the planet gears 70 are engaged with the ring gear 52 mounted on top cover 32. The rotation of the turntable 30 about axis 20 forces the planet gears to also rotate about axis 20, and their engagement with the (fixed) ring gear 52 causes each of the planet gears 70 to rotate about the axis of their respective gear posts 62. Each planet gear 70 is part of a stacked gear 64, and as such, rotation of each planet gear causes similar rotation of the associated chain gears 68. This rotation of the chain gears 68 in turn causes rotation of the train gears 66 and spin gears 56. In this manner, each pair of whisks 18 will counter-rotate with respect to each other, as the entire turntable 30 rotates about axis 20. This rotation rate of the whisks and turntable will be considered the first speed of mixer 10. As may be envisioned, this will cause the desired mixing of ingredients within the base 12.

If the user desired the second speed of mixer 10, the user will rotate the selector ring 44 to its second limit position. As described above, this will cause rotation of the selector disc 84, and vertical upward translation of the selector disc 84 and shaft slider 92. This will cause the slide gear 94 to disengage from the turntable drive gear 60 as the slide gear 94 moves to its second, upper limit position which brings the slide gear 94 into engagement with the sun drive gear 74. As the user then manually rotates the crank arm 16, this will cause similar rotation of the shaft 36 and slide gear 94. Due to its engagement with the sun drive gear 74, the entire sun gear 72 is rotated an identical amount to the crank arm 16. This rotation of the sun gear 72 will in turn cause rotation of each of the planet gears 70 about the axes of their respective gear posts 62. This has two effects. First, each planet gear 70 is also engaged to the surrounding ring gear 52. The rotation of the planet gears causes them to travel peripherally about the ring gear 52, which in turn causes rotation of the associated gear posts 62 and thus turntable 30. In this manner, turntable 30 is again driven to rotation about axis 20. Also as before, the planet gears 70 are a part of stacked gears 64, and as such the rotation of the planet gears 70 causes rotation of the chain gears 68. This in turn causes rotation of the various train gears 66 and spin gears 56. This rotation of the spin gears causes the relative counter rotation of each pair of whisks 18. This rotation rate of the whisks and turntable will be considered the second speed of mixer 10. As may be envisioned, this too will cause the desired mixing of ingredients within the base 12, but at a different rate, or with a decrease in the torques required to manually rotate the crank arm 16.

From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth of shown in the accompanying drawings is to be interpreted as illustrative, and not in a limiting sense.

What is claimed is:

1. A dual speed manual stand mixer, comprising:
   a base;
   a cover mounted on said base, said cover including a crank arm extending outward from a central axis, and a ring gear fixed thereto;
   a turntable mounted within said cover for rotation about said central axis, said turntable having a turntable drive gear fixed thereto and aligned with said central axis, and at least two pairs of whisks extending downward from said turntable into said base;
   at least two pairs of spin gears, each connected to an associated one of said whisks, and a chain gear in meshed engagement with a train gear which are in meshed engagement between each different pair of said two pairs of spin gears, each said chain gear including a planet gear fixed thereto, said planet gear being encompassed by and engaged with said ring gear, and a sun gear interposed between and engaged with said planet gear, said sun gear including a sun drive gear aligned with said central axis, said sun drive gear being spaced vertically above said turntable drive gear;
   a shaft extending from said crank to said turntable, said shaft being fixed with respect to said crank arm for rotation therewith; and
   a slide gear mounted on said shaft for rotation with said shaft and translation relative to said shaft, said slide gear being manually movable from a first position engaged with said turntable drive gear to a second position engaged with said sun drive gear.

\* \* \* \* \*